June 12, 1956     P. D. BERMINGHAM     2,750,215

MECHANICAL OIL SEAL

Filed Nov. 21, 1951

PETER D. BERMINGHAM
INVENTOR.

BY
J. William Freeman
ATTORNEY

United States Patent Office 2,750,215
Patented June 12, 1956

2,750,215

MECHANICAL OIL SEAL

Peter D. Bermingham, Suffield, Ohio

Application November 21, 1951, Serial No. 257,493

8 Claims. (Cl. 286—11)

This invention relates to sealing devices and in particular to sealing devices used to effectuate a fluid-tight connection between relatively rotating members.

Originally, initial attempts at effectuating a seal between a rotating shaft and a surrounding stationary member, were directed toward the use of packing material inserted in the slight space provided between the respective members. In addition to possessing a relatively short life span, this form of seal had the further disadvantage of not being able to withstand any appreciable degree of pressure.

Accordingly, the next efforts were directed towards the use of "wiper type" seals which essentially comprised a resilient member fixed on the stationary surface and designed to have frictional contact with the revolving shaft. The principal disadvantage of this type of seal was found in the wear caused on the rotating shaft. Specifically, it was found that a definite groove would be worn in the shaft notwithstanding the fact that the material of the wiper element was made of resilient material.

Present day seals, almost without exception, have comprised improvements on the "wiper type" seal by use of additional parts designed to increase the amount of sealing pressure exerted on the shaft. In many cases, failure of certain of these additional parts has resulted in fragmentary portions of the seal being carried into the machinery being lubricated, with a costly breakdown of the machinery resulting.

It is one object of this invention to provide an oil seal wherein the actual sealing is accomplished within the sealing mechanism itself.

It is a further object of this invention to provide a sealing unit featuring the use of a floating seal member wherein the degree of sealing effectiveness is directly proportional to the pressure exerted on the sealing unit.

It is a further object of this invention to provide a sealing unit wherein misalignment of the rotating member with respect to the stationary surrounding surface will not affect operation of the sealing unit.

It is a further object of this invention to provide a sealing unit featuring the use of a resilient sealing plate, which, by virtue of the recovery property thereof, insures an effective seal.

It is a further object of this invention to provide a seal of initial low cost and possessing extremely long life.

It is still a further object of this invention to provide a sealing unit comprising a relatively small number of component parts.

Other objects of the invention will become apparent upon consideration of the specification and the accompanying drawings.

Figure 1:
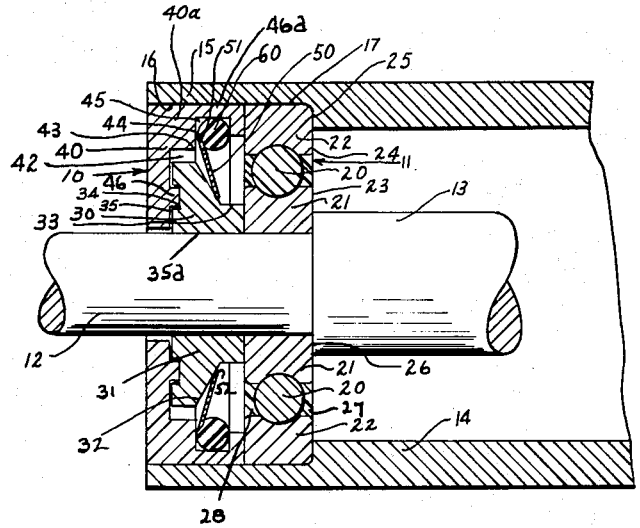
Figure 1 is a side elevation, partly broken away and in section, showing an installation incorporating the use of the improved sealing device.

Referring now to the drawings and in particular to Figure 1 thereof, the sealing unit, generally indicated as 10, and a ball bearing assembly 11, are shown mounted on a reduced portion 12 of a shaft 13, which shaft rotates within a relatively stationary housing 14 provided with a reduced wall portion 15 for reception therein of the peripheral portions 16 and 17 of the sealing unit 10 and the bearing assembly 11, respectively.

Because the construction of the ball bearing assembly 11 does not directly affect the operation of the sealing mechanism 10, it is manifest that any one of several types of ball bearing assemblies could be employed in the installation shown in Figure 1, without materially affecting the operation of the same. Accordingly, the standard ball bearing assembly shown in Figure 1 comprises a plurality of hardened steel balls 20, 20 receivable within inner and outer raceway members 21 and 22 which are fixedly positioned with respect to the reduced portion 12 of the shaft 13 and the reduced wall portion 15 of the housing 14, respectively. Sidewall portions 23 and 24 of the members 21 and 22, respectively, abut respectively against shoulders 25 and 26 of the housing 14 and the shaft 12, while retaining rings 27 and 28 serve to align balls 20, 20 in proper position between raceway members 21 and 22.

The sealing mechanism per se, generally indicated at 10, comprises relatively rotatable male and female sealing elements 30 and 40, having peripheral edge portions of a sealing plate 50 retained in sealing relation therewith by an annular ring 60 in a manner to be described.

To this end, the male sealing element 30 includes a tubular disc member 31 receivable on the shaft 12 in fixed relationship therewith and being provided with a tapered exterior surface 32 terminating in a reduced wall portion 33.

Similarly, the female sealing element may include a registering tubular disc 40a having the peripheral surface 16 thereof fixedly engaged by press fit against said stationary surface 15. Registration of the female element 40 with the male element 30 is facilitated by provision of a circular cavity 42 of slightly greater radial diameter than the male sealing element and having its depth defined by a shoulder 43 which also serves to define one side wall 44 of an annular groove 45 provided in a reduced wall portion 46a of said tubular disc 40a.

For providing alignment between the respectively rotatable male and female members 30 and 40, an annular projection 46, provided on the face of the cavity 42, is receivable within an annular groove 34, provided in an end face 35 of the male sealing element 30. While this connection serves primarily as a means for providing aligned rotation between the male and female sealing elements 30 and 40, it is manifest that the same also serves as a dust trap for preventing the entrance of foreign particles from the exterior of any installation featuring use of the sealing unit being described.

Figure 2:
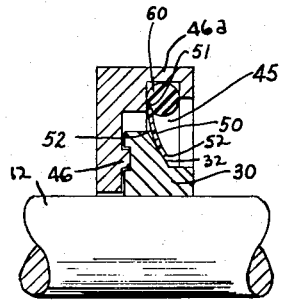
Figure 2 is a fragmentary side view illustrating the improved sealing device under great pressure.

Referring now to Figures 1 and 2 for a description of the apertured sealing plate 50, it is seen that the same has a beveled peripheral portion 51 thereof loosely receivable within the groove 45 of female sealing element, while the inner peripheral edge portion 52 thereof is frictionally engageable with the tapered surface 32 of the male sealing element 30.

While the material of the sealing plate 50 may be of non-resilient quality, it has been found that use of a resilient material materially decreases the possibility of failure within the sealing unit by virtue of inherent recovery properties of the same which cause the plate 50 to continually press against the tapered surface 32 of the male sealing element 30, as previously described.

For the purpose of providing a varying degree of sealing pressure within the groove 45 of the female sealing element, an annular ring 60, of resilient material, is provided therein, the arrangement being such that an increase in pressure upon the sealing plate 50 directly affects the pressure exerted by the beveled edge portion 51 upon the resilient annular ring 60. (See Fig. 2).

In use or operation of the improved sealing device for effectuating a fluid-tight connection between a rotating member 13 and a relatively stationary surrounding surface 14, the same may be first assembled into a unit by positioning the male sealing element 30 within the female sealing element 40 in aligned relationship therewith. At this point the sealing plate 50 may be positioned with the outer peripheral edge portion 51 thereof being placed in the groove 45 of the female sealing member 40 and the inner peripheral edge portion 52 being received against the tapered surface 32 of the male sealing element 30. Insertion of the annular ring 60 within the groove 45 of the female sealing member 40 completes assembly of the sealing unit 10.

With the sealing unit thus assembled, the same may then be urged into position between the rotating member 13 and the relatively stationary surrounding surface 14, with the peripheral portion 16 of the female sealing element and the aperture 35a of the male sealing element 30 frictionally engaging the stationary surface 15 and the rotating shaft 12, respectively.

In this position rotation of the shaft 13 will cause relative rotation to occur between the male sealing element 30 and the remaining elements of the sealing unit, namely, the female sealing element 40, the sealing plate 50 and the annular ring 60. As long as the pressure exerted by the enclosed oil remains constant, the operation of the sealing unit will be substantially as shown in Figure 1, with sealing being effectuated in the groove 45 and on the tapered surface 32 as previously explained. However, when the pressure exerted against the sealing plate is increased as shown in Figure 2, it is manifest that this increase will operate to force the sealing plate 50 into tighter sealing engagement with the tapered surface 32 and the annular ring 60 received in the groove 45 of the female sealing member 40. It is also manifest that a drastic reduction in the pressure exerted by the enclosed oil would not cause a breaking of seal on the tapered surface 32 since the inherent resiliency of the sealing plate 50 continually causes the same to be urged into sealing contact with said tapered surface 32. In the event that a non-resilient material is used to form the sealing plate 50, stop means (not shown) may be incorporated on the tapered surface 32 to accomplish the same result.

It will be seen from the foregoing that a new and novel approach has been made to the problem of effectuating a fluid-tight seal between a rotating member and a relatively stationary surrounding surface, which approach features the use of a "floating" sealing plate which automatically adjusts itself to variations in pressure and which is not affected by misalignment of the parts being sealed.

Figure 3:
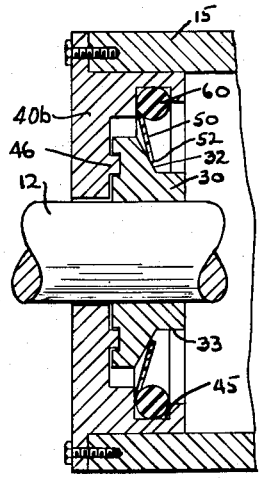
Figure 3 is a side elevation, partly broken away and in section, showing how the device of Figure 1 can be incorporated in a different type of installation.

In the modified form of the invention shown in Figure 3, the basic sealing mechanism is substantially the same as previously set forth, with the exception that the shape of the female sealing element 40b is slightly altered to illustrate the adaptability of the sealing unit to different types of installations.

Figure 4:
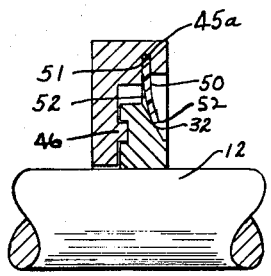
Figure 4 is a fragmentary view of a modified form of the invention.

In Figure 4 there is illustrated a slightly modified form of the invention similar in many respects to the device shown in Figures 1 and 2 but different, in that the sealing plate 50 is fixedly engaged within a groove 45a. While this eliminates varying degrees of sealing relationship at this point, it is manifest that a varying degree of sealing pressure will be present between the tapered surface 32 and the inner peripheral portion of the male sealing plate 50. It accordingly follows that the principle employed in this modification could be reversed and the inner peripheral edge portion 52 could be fixed to the male sealing element 30 and have the outer peripheral edge portion 51 rotatably received in varying degrees of sealing relationship within the groove 45a.

Figure 5:
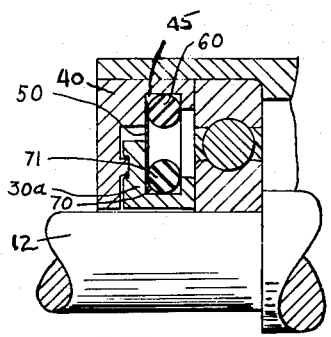
Figure 5 is a fragmentary view of another modification of the invention.

In the modification shown in Figure 5, a male sealing disc 30a is provided with an annular groove 70 for reception therein of the inner peripheral edge portion of the sealing plate 50. As in the case of groove 45 of the female sealing element 40, the sealing plate 50 is retained in the groove 70 in varying degrees of sealing relationship by an annular ring 71 of resilient material.

For increasing the life of the male sealing element 30a, it has been found that use of a graphalloy material will provide a part which will satisfactorily operate under the conditions described.

Figure 6:
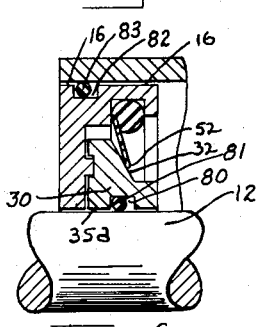
Figure 6 is a fragmentary view of a still further modification of the invention.

In Figure 6 there is illustrated an improved form of the invention designed for use in installations where a press fit with either the shaft or the stationary surface is undesirable. In accordance with this thought, the male sealing element 30 is provided with an annular groove 80 on the surface 35a thereof which is normally engageable with shaft 12 and an annular ring member 81 is receivable within said groove 80 for effectuating a seal between the shaft 12 and the male sealing element 30. A similar groove 82 is provided on the surface 16 of the female sealing element 40 for reception therein of an annular ring 83 which serves to effectuate a seal between the female sealing element 40 and the relatively stationary surface 15.

Other modifications may be resorted to without deviating from the spirit thereof or the scope of the appended claims.

What is claimed is:

1. A mechanical seal, comprising; a first sealing element having a radial groove defining a side wall and a bottom wall; a flexible element positioned in said groove in abutment with said side wall and said bottom wall; a second sealing element relatively rotatable with respect to said first sealing element; and a plate positioned in sealing relationship between said sealing elements, and having a peripheral edge portion thereof engageable against said side wall at its point of contact with said flexible element, whereby said point of contact between said flexible element and said side wall tensionally spaces said peripheral edge portion of said plate in radially shiftable relationship with respect to said bottom wall of said groove.

2. A mechanical seal, comprising; a sealing element having an annular groove that includes a side wall and a bottom wall; a resilient endless insert positioned therein and being contacted by said side wall and said bottom wall of said groove; a second sealing element rotatable with respect to said first-named sealing element; and a plate positioned in sealing relationship between said sealing elements and having a peripheral edge portion thereof engageable against said side wall of said groove at its point of contact with said insert, whereby said point of contact between said insert and said side wall tensionally spaces said peripheral edge portion of said plate in radially shiftable relationship with the bottom wall of said groove.

3. The device of claim 2 further characterized by the fact that said resilient endless insert is of circular cross-section.

4. A mechanical seal of the character described, comprising; a first annular sealing member having an axially extending wall surface provided with a groove having a side wall and a bottom wall; a second annular sealing member relatively rotatable with respect to said first sealing member and having a tapering surface that projects radially outwardly from said second sealing member; means for aligning said sealing members about a common axis of rotation, whereby said groove and said tapering surface are disposed in substantially the same radial plane; an O-ring, receivable in said groove and having peripheral contact with said side wall thereof; an apertured disc disposed about said common axis and having one peripheral surface thereof engageable in radially shiftable relationship with said tapering surface, while the remaining peripheral edge portion thereof is receivable in said groove adjacent a point of contact between said O-ring and said side wall of said groove, whereby said O-ring tensionally spaces said peripheral edge portion of said disc in radially shiftable relationship with respect to the bottom wall of said groove.

5. A mechanical seal of the character described, comprising; a first annular sealing member having an axially extending wall surface provided with a groove having a side wall and a bottom wall; a second annular sealing member relatively rotatable with respect to said first sealing member and having a tapering surface that projects radially outwardly from said second sealing member; means for aligning said sealing members about a common axis of rotation, whereby said groove and said tapering surface are disposed in substantially the same radial plane; an O-ring, receivable in said groove and having peripheral contact with said side wall thereof; an apertured disc disposed about said common axis and having one peripheral surface thereof engageable in radially shiftable relationship with said tapering surface, while the remaining peripheral edge portion thereof is receivable in said groove adjacent a point of contact between said O-ring and said side wall of said groove, whereby said O-ring tensionally spaces said peripheral edge portion of said disc in radially shiftable relationship with respect to the bottom wall of said groove; said means for aligning said sealing members including radial faces that respectively define complemental guide means, whereby said radial faces of said sealing members can be maintained in parallel with each other during relative rotation therebetween.

6. The device of claim 4 further characterized by the fact that said peripheral edge portion that contacts said side wall and said O-ring is beveled.

7. The device of claim 4 further characterized by the fact that at least one of said sealing members includes a second axially extending surface that is radially spaced from the first-mentioned surface thereof; said second surface being provided with an annular groove; and at least one annular ring member receivable within said just described groove.

8. A mechanical seal of the character described, comprising; a first annular sealing member having an inner axially extending wall surface provided with a groove that includes a radial side wall and an axially extending bottom wall; a second annular sealing member relatively rotatable with respect to said first sealing member and having a tapering surface that projects radially outwardly from said second sealing member; means for aligning said sealing members about a common axis of rotation, whereby said groove and said tapering surface are disposed in substantially the same radial plane; an O-ring, receivable in said groove of said first sealing member and having peripheral contact with the side wall and bottom wall thereof; an apertured disc having the inner peripheral portion thereof receivable against said tapering surface of said second sealing member and having the outer peripheral edge portion thereof engageable with said side wall of said groove adjacent a point of contact between said O-ring and said side wall of said groove, whereby said O-ring tensionally spaces said outer peripheral edge portion with respect to said bottom wall of said groove.

References Cited in the file of this patent

UNITED STATES PATENTS

| | | |
|---|---|---|
| 330,372 | Bemis | Nov. 17, 1885 |
| 1,560,669 | Dennedy | Nov. 10, 1925 |
| 1,985,063 | Simpson | Dec. 18, 1934 |
| 2,023,898 | Olson | Dec. 10, 1935 |
| 2,227,408 | Hately | Dec. 31, 1940 |
| 2,251,012 | Delaval-Crow | July 29, 1941 |
| 2,382,960 | Compton et al. | Aug. 21, 1945 |
| 2,404,610 | Abell | July 23, 1946 |
| 2,590,696 | Gregoire | Mar. 25, 1952 |
| 2,600,433 | Saywell | June 17, 1952 |
| 2,600,434 | Saywell | June 17, 1952 |

FOREIGN PATENTS

| | | |
|---|---|---|
| 588,471 | Great Britain | of 1947 |